United States Patent [19]
Geiser et al.

[11] Patent Number: 5,360,006
[45] Date of Patent: Nov. 1, 1994

[54] AUTOMATED METHOD FOR DIGITAL IMAGE QUANTITATION

[75] Inventors: Edward A. Geiser; David C. Wilson; Gordon L. Gibby, both of Gainesville, Fla.

[73] Assignee: University of Florida Research Foundation, Inc., Gainesville, Fla.

[21] Appl. No.: 174,763

[22] Filed: Dec. 29, 1993

Related U.S. Application Data

[63] Continuation of Ser. No. 955,865, Jan. 28, 1993, abandoned, which is a continuation-in-part of Ser. No. 537,032, Jun. 12, 1990, abandoned.

[51] Int. Cl.$^5$ .............................................. A61B 5/00
[52] U.S. Cl. .................................................. 128/653.1
[58] Field of Search ........... 128/653.1, 650.07, 660.07, 128/661.04, 695; 364/413.25

[56] References Cited

U.S. PATENT DOCUMENTS

| | | | |
|---|---|---|---|
| 4,101,961 | 7/1978 | Reiber | 364/417 |
| 4,907,156 | 3/1990 | Doi et al. | 364/413.13 |
| 4,936,311 | 6/1990 | Oe | 128/695 |
| 5,056,024 | 10/1991 | Oe | 128/654 |
| 5,107,838 | 4/1992 | Yamaguchi | 128/713 X |

OTHER PUBLICATIONS

Kaneko, Toyohisa, et al., "Stralight-Line Approximation for the Bounda of the Left Ventricular Chamber from a Cardiac Cineangiogram," IEEE Transactions on Biomedical Engineering, Nov. 1972, pp. 413–416.

Melton, H. E., et al. "Rational-Gain-Compensation for Attenuation in Ultrasonic Cardiac Imaging", 1981 Ultrasonics Symposium pp. 607–611.

Henry, Walter L., et al. "Parasternal Short Axis View—Left Ventricle", Report of the American Society of Echocardiography Committee on Nomenclature and Standards, Nov. 1982.

Meyer, C. R., et al., "Estimation of Ultrasonic Attenuation and Mean Back-scatterer Size Via Digital Signal Processing", Ultrasonic Imaging 6, 1984 pp. 13–23.

Zhang, Liang-Fu, et al., "An Effective Algorithm for Extracting Serial Endocardial Borders from 2-Dimensional Echocardiograms", IEEE Transactions on Biomedical Engineering, vol. BME-31, No. 6, Jun. 1984, pp. 441–447.

Edward A. Geiser, "Applications of Automatic Edge Detection and Image Enhancement Techniques to Two-Dimensional Echocardiography and Coronary Disease", Chapter 2, pp. 483–508 from Echocardiography in Coronary Artery Disease, 1988.

Chu, C. Henry, et al., "Detecting Left Ventricular Endocardial and Epicard Boundaries by Digital Two-Dimensional Echocardiography", IEEE Transactions on Medical Imaging, vol. 7, No. 2, Jun. 1988, pp. 81–90.

Geiser, Edward A., et al., "Clinical Validation of an Edge Detection Algorithm for Two-Dimensional Echocardiographic Short-Axis Images", Journal of the American Society of Echocardiography, vol. 1, No. 6, pp. 410–421.

Friedland, N., et al., "Automatic Ventricular Cavity Boundary Detection from Sequential Ultrasound Images Using Simulated Annealing", IEEE Transactions on Medical Imaging, vol. 8, No. 4, Dec. 1989, pp. 344–353.

Adam, Dan, et al. "Semiautomated Border Tracking of Cine Echocardiogaph Ventricular Images", IEEE Transactions on Medical Imaging, vol. MI-6, No. 3, Sep. 1987.

Primary Examiner—Francis Jaworski
Attorney, Agent, or Firm—Spensley Horn Jubas & Lubitz

[57] ABSTRACT

A method is provided for automatically determining quantitative characteristics of organ images, especially echocardiographic images. A diagnostic image is obtained and then a center point for the approximately curvilinear bounded organ is determined by repeatedly filtering the image with a set of circular arc filters until a maximum value for the filter set is obtained, whereupon parameters of cardiac wall motion, wall thickness and area change fraction may be determined to detect ischemic or other organ abnormality.

25 Claims, 6 Drawing Sheets

AUTOMATED METHOD FOR DIGITAL IMAGE QUANTITATION

RELATED APPLICATION

This is a continuation of application Ser. No. 07/955,865 filed on Jan. 28, 1993, now abandoned, which is a continuation-in-part of Ser. No. 07/537,032 filed on Jun. 12, 1990, now abandoned.

BACKGROUND OF THE INVENTION

1. Field of the Invention

This invention relates to a method for quantitatively analyzing digital images of approximately elliptical body organs, and in particular, two-dimensional echocardiographic images.

2. Related Art

Two-dimensional ultrasonic imaging is used as an important non-invasive technique in the comprehensive characterization of a number of body organs. In ultrasonic imaging, a sound pulse is sent along a ray from a transducer towards the organ that is being imaged. The pulse is attenuated and reflected when it hits a medium with an acoustic impedance different from that of the medium in which the pulse is traveling. The time the sound pulse takes in transit is a measure of the distance of the boundary from the transducer, and the amount of energy that is reflected is a measure of the difference of the acoustic impedance across the boundary. (In practice, since the energy of the pulse diminishes as it travels, post-processing Of the reflected signal includes time gain control that compensates the attenuation of the signal over time). Assuming the pulse travels at a single speed in the body, and by taking different rays across the plane, a two-dimensional record of the received energy in spatial coordinates represents a cross-sectional view of the imaged organ.

Echocardiography is the application of ultrasonic imaging to the heart. Echocardiography has experienced widespread acceptance in the evaluation of cardiac disease and in characterizing the structure and function of the heart. This acceptance is in large part due to its non-invasive nature, and its real-time capability for observing both cardiac structure and motion. Using echocardiography, a considerable amount of quantitative information can be obtained concerning cardiac anatomy, chamber diameter and volume, wall thickness, valvular structure, and ejection fraction.

The real-time capability of echocardiography can be used to measure the variation of the shape of head structures throughout the cardiac cycle. These analyses require the complete determination of inner (endocardial) and outer (epicardial) boundaries of the head wall, particularly of the left ventricle. Present evidence indicates that sensitive detection of ischemic disease with two-dimensional echocardiography requires knowledge of the endocardial border on echocardiographic frames throughout the cardiac cycle as well as at end-diastole and end-systole.

Since both global and regional left ventricular function are major variables used to determine prognosis in cardiac disease, there is considerable interest in the ability to quantitate function indexes from echocardiographic images. Presently, such indexes (e.g., left ventricular chamber volume and left ventricular ejection fraction) are calculated from observer-defined cardiac boundaries traced with either a light pen or a digitizing tablet. Tracing of endocardial borders on two-dimensional echocardiograms is tedious and the borders are highly subjective. Indeed, in most systematic studies, substantial intraobserver and interobserver variability has been found in such observer-defined cardiac boundaries.

Manually defining such boundaries becomes increasingly labor intensive when the analysis of a complete cardiac cycle is needed to provide a description of the systolic and diastolic wall motion pattern, or when a number of echocardiographic frames have to be processed in order to obtain a long period time-history of cardiac function. It is therefore desirable to automate as much as possible the determination of boundaries of echocardiographic images. Automated definition of the boundaries would improve the reliability of the quantitative analysis by eliminating the subjectivity of manual tracing.

Finding boundaries in echocardiograms automatically by computers is often difficult because of the poor quality of the echocardiographic images. The lack of clear definition of the boundaries is due to the intrinsic limitations of echo imaging, such as low image intensity contrast, signal dropouts in the image, and boundary discontinuity in any given frame. ("Dropouts" occur where sound waves are reflected from two different levels in a structure and the reflected waves arrive simultaneously at the face of the transducer but out of phase, causing a cancellation of their amplitudes. Thus, no return signal is perceived at that depth).

The poor quality of echocardiograms is also attributable to the reverberations of the initial sound pulse, and "speckle" noise, caused by the back scattering of the incident wave front after it hits the tissue microstructures (this phenomenon produces a very fine texture, a "salt and pepper" pattern, that is superimposed on the image). Another limitation of echocardiographic imaging is that Sound reflection is not very pronounced when the angle between a boundary of the heart and the ray along which the sound pulse is traveling is small. Hence, the lateral wall boundaries of the heart are usually not very well defined in echocardiographic images. Thus, in imaging the left ventricle, typically only the anterior and posterior cardiac walls are well-defined.

In the past several years, advances in computer data processing technology have allowed the application of several different automatic boundary detection methods to echocardiographic images. However, most researchers have had difficulties with image enhancement and boundary detection with echocardiographic images because of the low signal-to-noise ratio and large discontinuities in such images. Thus, automated border detection has been reported in two-dimensional echocardiographic images, but only when the images are of good quality and certain smoothing techniques are employed prior to edge detection in order to render the endocardial edge more continuous. An overview of the field is set forth in Chapter 22 of *Echocardiography in Coronary Artery Disease*, Kerber, Richard E., Ed., entitled *Applications of Automatic Edge Detection and Image Enhancement Techniques to Two-Dimensional Echocardiography and Coronary Disease*, by E. A. Geiser (Futura Publishing Company, Mount Kisco, N.Y. 1988 ISBN 087993-325-9).

Consequently, there is a need for a method for automatically determining quantitative characteristics of ultrasonic images, especially echocardiographic images. In particular, there is a need for a method that can automatically determine the center of an imaged structure and approximate the borders of such a structure. With respect to echocardiographic images, there is a need for an automated system that can determine the canter of the left ventricle, approximate both the endocardial and epicardial borders, and estimate cardiac wall motion without the necessity of any user input. In addition, it is also desirable to automatically detect the presence of a flattened interventricular septum caused by pressure or volume overload from the right ventricle.

The present invention provides such a method. The invention uses mathematical techniques implemented in computer software which allows near real-time automatic quantitation of cardiac wall motion, cardiac wall thickness, and the area change fraction of two-dimensional short-axis echocardiographic image studies. Some applications of this system would be in a hospital at a patient's bedside, or in an echocardiography suite, where a detailed evaluation of a patient's cardiac health is required. Another application would be in an operating room, where elderly patients with significant coronary arterial disease are to undergo surgery. The invention provides a means for continuously and automatically monitoring a patient's heart for possible ischemic changes during surgery. Thus, an attending physician could be warned of a potential danger without requiring continuous physician monitoring of a patient, or invasive catheter placement.

SUMMARY OF THE INVENTION

The inventive method in its preferred embodiment uses circular arc filters of very large size to automatically identify the center-point of the left ventricle and the area enclosed by the epicardial border. The circular arc filters used to determine the approximate epicardial border region along the posterior wall of the left ventricle can be thought of as an approximation of the sum of all nearby directional derivatives taken in the direction of the center-point. The inventive method then uses a pair of circular arc filters to identify the endocardial and epicardial border regions along the anterior ventricle wall at the same time. This technique helps reduce the possibility that the endocardial border will be mistakenly identified as the epicardial border, or vice versa.

After the automatic determination of the center-point, generation and analysis of circular sector first derivative histograms determines the most probable locations of the epicardial and endocardial borders. A set of six elliptical arcs are then chosen to model the endocardial and epicardial borders as the union of the six elliptical arcs spliced together. Four of the six arcs are used to model the entire epicardial border, while the other two arcs model the endocardial border along the anterior wall of the ventricle. The gap between the best-fit pair of such curves provides a measure of wall thickness along the anterior wall. The use of paired arcs helps prevent identification of the endocardial border as the epicardial border, or vice versa.

A number of one-dimensional first derivative histograms are then formed for each of a corresponding number of sectors emanating from the determined center-point. Cross-correlation of the histograms between the echocardiographic frame at end-diastole and the echocardiographic frame at end-systole is used to detect cardiac wall motion in each of the different sectors. The cross-correlation technique provides a dynamic matched filter requiring only an imperfect estimate of the endocardial border. The inventive method thus provides quantitation of regional wall motion in real-time or near real-time without performing actual border detection. This process maximizes the image information used in quantitation.

The invention also includes a means for determining the presence of a flattened septum caused by pressure or volume overload from the right ventricle. A paired set of straight line filters are applied to the echocardiographic image in a manner similar to the paired circular filters used to detect the anterior epicardial and endocardial borders.

The invention also includes a test to detect the lack of signal ("dropout") across the septum of the left ventricle. This test consists of a comparison of the minimum average grey level of a small image region in the cavity of the heart with the maximum average grey level of a similarly sized region chosen along a line from the center of the ventricle in the direction of the septum. If the ratio of grey levels in the maximum area to the minimum area is less than two, signal dropout is considered to have been detected.

The invention further includes a method of performing blood pool classification on a pixel-by-pixel basis, starting from an automated determination of the center of the ventricle.

The details of the preferred embodiment of the present invention are set forth below. Once the details of the invention are known, numerous additional innovations and changes will become obvious to one skilled in the art.

BRIEF DESCRIPTION OF THE DRAWINGS

Like numbers and designations in the drawings refer to like elements.

DETAILED DESCRIPTION OF THE INVENTION

Throughout this description, the preferred embodiment and examples shown should be considered as exemplars, rather than limitations on the method of the present invention.

Overview

Figure 1:
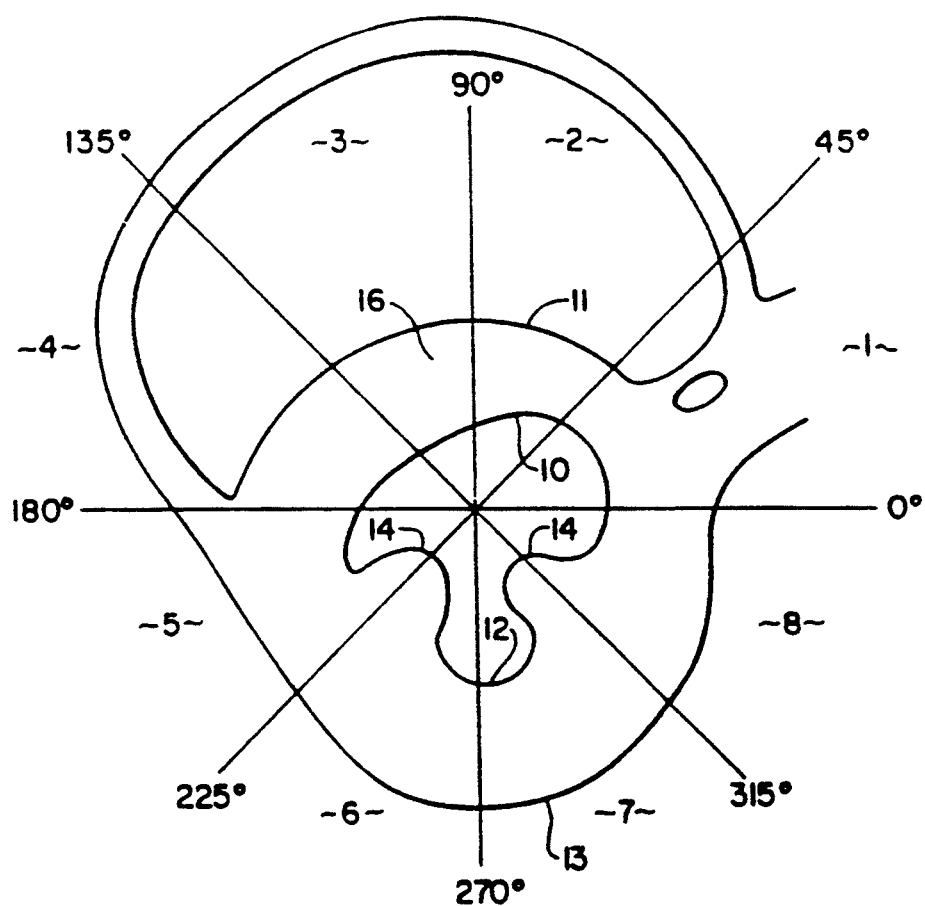
FIG. 1 discloses a diagram of the left ventricle and part of the right ventricle of a heart imaged along the shod axis of the heart.

FIG. 1 discloses a diagram of the left ventricle and part of the right ventricle of a heart viewed along the short axis of the heart. Indicated for the left ventricle are the anterior endocardial border 10, the anterior epicardial border 11, the posterior endocardial border 12, and the posterior epicardial border 13. The regions of tissue protruding into the left ventricle near the posterior endocardial border 12 are the papillary muscles 14. The cross-section of the left ventricle is approximately elliptical in cross-section for both the endocardial border and the epicardial border.

Shown superimposed on the diagram of the left and right ventricles is a set of lines that are commonly used to arbitrarily divide the left ventricular region into eight 45° sectors. The sectors are commonly numbered in order from 1 through 8, beginning with the sector encompassing the anterior left ventricle free wall 1 and proceeding counterclockwise to the antero-lateral left ventricular free wall 8. Sectors 2, 3, and 4 encompass the interventricular septum 16, which separates the left ventricle from the right ventricle.

In the preferred embodiment, the inventive method is implemented by means of a computer program on a general purpose computer. Echocardiographic images are obtained from an ultrasound system that acquires frames at a rate of approximately 30 frames per second. Such ultrasound systems are well known in the art. The frames are digitized and stored on any convenient storage medium (such as a magnetic or optical disk drive). In the preferred embodiment, digitization of the frames is carried out using a 256×256 pixel matrix. Sampling and digitizing such image data is well known in the art, and is commonly carried out by "frame grabber" circuitry. Preferably, video frames for the entire cardiac cycle to be studied are digitized.

The first step in the automated process of the present invention is to determine the center-point of the left ventricle and a search region for border discrimination. Once the center-point and search regions are determined, the probable positions of the epicardial and endocardial borders are more closely approximated by generating histograms along each of a number of circular segments based on the computed center-point. The approximated epicardial and endocardial borders are then compared to a set of paired elliptical arcs to model the borders of the left ventricle. The echocardiographic image may then be displayed with the modeled border superimposed on the image.

Determination of Center-Point and Search Regions

The most prominent features in a two-dimensional echocardiographic image are the high intensity values representing the pericardium behind the posterior wall. Therefore, the posterior epicardial border 13 is normally reasonably well-defined. However, the presence of the papillary muscles 14 and other internal structures in the lower interior of the head obscure the bounds of the posterior endocardial border 12.

Figure 2A:
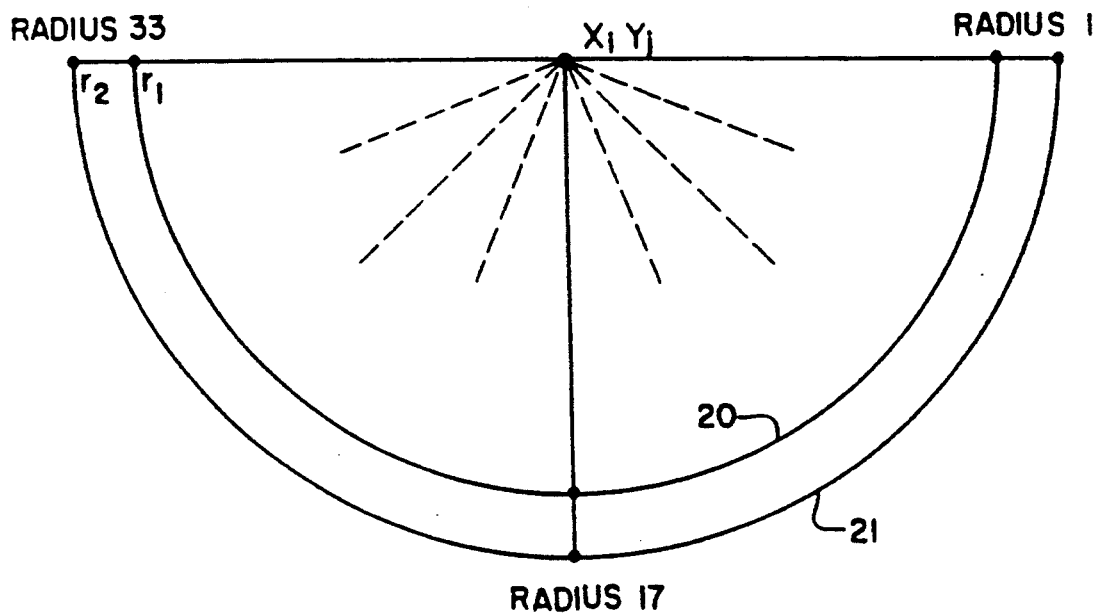
FIG. 2a is a diagrammatic representation of the posterior circular arc filter used in the illustrated embodiment of the present invention.

Consequently, in the preferred embodiment, a single "circular arc" filter is used to compute a region of interest for the posterior epicardial border 13 of the heart. The process basically comprises computing for each pixel $x_i, y_j$ the maximum of a set of numbers $s_2 - s_1$, $s_3 - s_2, \ldots s_8 - s_7$, where each $s_k$ represents the sum of pixel values on 33 radii uniformly distributed along a set of semicircular arcs of radius 30, 35, 40, 45, 50, 55, 60, and 65 pixel lengths, respectively, in the illustrated embodiment. The angles associated with the pixel locations along the semicircular arc range from 180° to 360°, with each sector encompassing about 5.6° in the illustrated embodiment. The circular arc filter used to determine the approximate posterior epicardial border 13 region can be thought of as an approximation of the sum of all nearby directional derivatives taken in the direction of the center-point. FIG. 2a shows a diagrammatic representation of the posterior circular arc filter used in the illustrated embodiment of the present invention. Shown diagrammatically are an inner arc 20 and an outer arc 21 of pixel locations at two selected distances from $x_i, y_j$.

Thus, for the 33 radii, the intensity values of the pixels on the radii a pre-set distance from $x_i, y_j$ are summed and then subtracted from a similar sum for the next pre-set distance. For example, if each radius is started at 30 pixel lengths from $x_i, y_j$ and increased by five pixels for each arc computation, then the pixel intensities on each radius at 30 pixel lengths from $x_i, y_j$ are summed to form $s_1$, then all of the pixel intensities on each radius at 35 pixel lengths are summed to form $s_2$, etc.

An advantage of the present invention is that it uses the maximum value from seven filters (in the illustrated embodiment) each having 66 non-zero weights. Most edge-detection techniques use such standard operators as the 3×3 Sobel, Laplace, Prewitt, or Kirsh operators. Thus, the maximum number of non-zero weights in these standard operators is nine. Even edge-detectors having a size larger than 3×3 are frequently simply larger versions of these standard operators. The large filter size of the present inventive method maximizes the use of the image information used in quantitation.

Application of this circular arc filter has the effect of superimposing a series of seven semicircular regions having a "thickness" of five pixel lengths and centered on each pixel of the echocardiographic image. Identifying the semicircular region that "covers" the largest number of high-intensity pixels determines one pixel that is designated $x_0, y_0$, a first tentative center-point for the left ventricle, and a radius which approximates the distance to the posterior epicardial border 13.

In a second embodiment of the invention, the above operation is refined to reduce computational requirements of computing the filter values. The best-fit filter is computed in three passes rather than in one pass, in the first pass, the operator is evaluated at every third x and y location in the image, and the actual operator computed is the maximum of the sums: $(s_k - s_{k-c}) + (s_k - s_{k-2c})$, where each $s_k$ term is computed as described above, and c is a constant set to be 1 unit of increment in the preferred embodiment (in the preferred embodiment, c=5 pixels, which is approximately $\frac{1}{2}$ of the minimum wall thickness—about 10 pixels—expected to appear in any image). In addition, the location in the image midway along each "outer" circular arc (i.e., the pixel location closest to the bottom of the image, as shown in FIG. 2a) is constrained to have a pixel value greater than $\frac{1}{2}$ the highest expected value in the image. This added condition ensures that only locations of high intensity will be considered as possible epicardial border locations.

The extra term $s_k - s_{k-2c}$ is added to allow for the fact that the epicardium may not be perfectly circular. However, this added factor also tends to emphasize the high pixel values of the "speckle" noise usually present adjacent to the posterior pericardium.

This first pass will not always provide an optimal center approximation $x_0,y_0$, but experience has shown that the approximated center does lie within the ventricular chamber.

In the second pass, the filter is computer at every other x and y in a band 41 pixels wide centered about the $y_0$ column identified as a best-fit in the first pass (i.e., 20 pixels on either side of the first approximated center, $x_0,y_0$). Once again, the operator computed is the maximum of the sums: $(s_k - s_{k-c}) + (s_k - s_{k-2c})$. Evaluation of this operator again returns a best-fit center-point, $x_0,y_0$.

In the third pass, the filter is computed at every x and y in a band 11 pixels wide centered about the $y_0$ column identified as a best-fit in the second pass (i.e., 5 pixels on either side of the second approximated center, $x_0,y_0$). In this pass, the extra term is not used, and the operator computed is the maximum of the sums: $(s_k - s_{k-c})$. Evaluation of this operator again returns a best-fit center-point, $x_0,y_0$. Dropping the extra term $s_k - s_{k-2c}$ allows for improved precision in the estimate of the epicardial border.

This three pass technique reduces the computation time for generating the best fit approximation of $x_0,y_0$ to one-third of the time required for the first embodiment when implementations of both embodiments are run on a particular computer.

Other values may be selected for the radial increments and the number of radii used in determining the semicircular arc that defines the first tentative ventricular center-point and posterior search region. Further, rather than computing the set of circular arc filter values for every pixel in the echocardiographic image, a subset of pixels may be pre-selected. For example, pixels near the edge of the image may be skipped because the center of the left ventricle can be assumed to be in a central region of the image rather than near an edge. As another example, pixels that are within 30 pixels of the bottom of the image may be omitted, since the circular arcs in the illustrated embodiment have a minimum radius of 30 pixel lengths. Moreover, the circular arc filters need not be computed for every pixel, but only for pixels spaced a desired distance apart, in order to decrease the number of potential center-point sites and reduce computational requirements. Other simplifying assumptions may be made based on similar considerations.

After the posterior search region is computed, the anterior endocardial and epicardial borders 10, 11 are approximated simultaneously by a procedure basically similar to the posterior circular arc filtering method. A set of pixels near $x_0,y_0$ are selected as starting points for generating circular arc filters. In the preferred embodiment, the starting pixels have an x value within 10 pixel lengths of $x_0$ (i.e., $|x - x_0| < 10$), and a y value less than 20 pixel lengths greater than $y_0$ (i.e., $y < y_0 + 20$). This limits the number of pixels for which circular arc pairs must be computed.

For the anterior region, because the endocardial border 10 is generally more clearly defined than in the posterior region, a pair of coupled circular arc filters are concurrently computed. The inner circular arc filter approximates the location of the anterior endocardial border 10, while the outer circular arc filter approximates the location of the anterior epicardial border 11. By using coupled circular arc filters, the possibility that the epicardial border 11 will be identified as the endocardial border 10, and vice versa, is reduced.

Figure 2B:
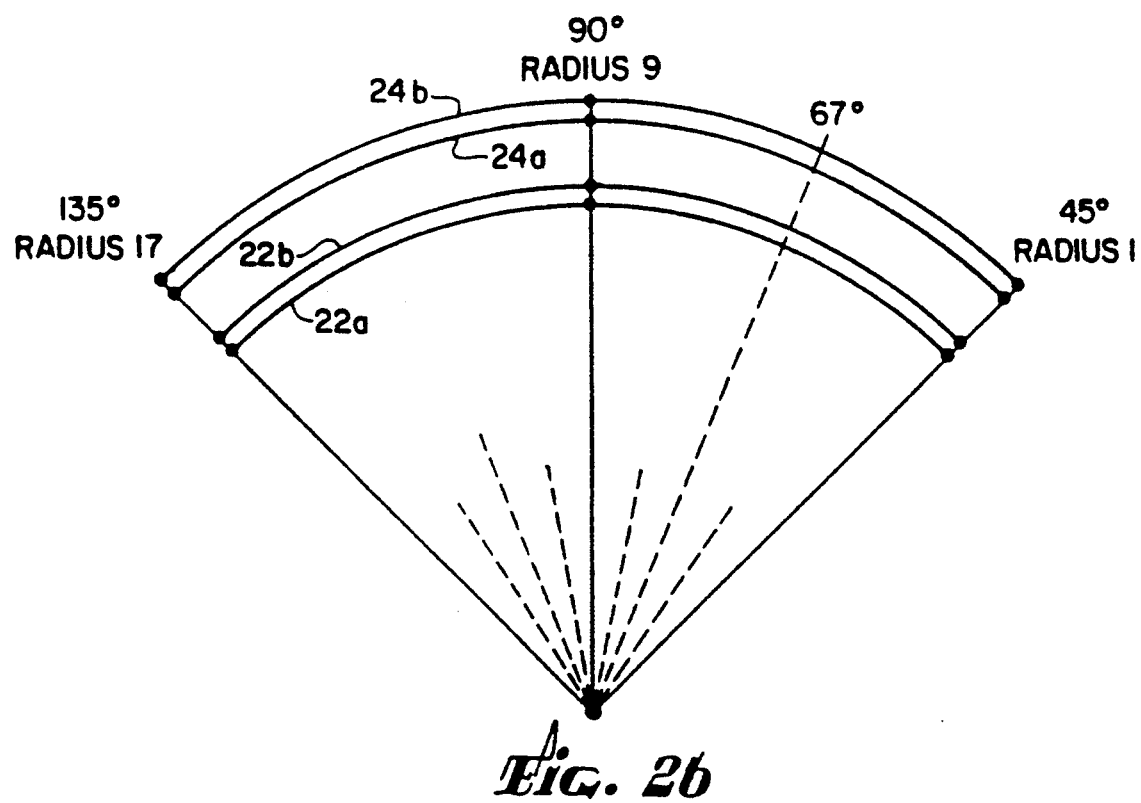
FIG. 2b is a diagrammatic representation of the anterior paired circular arc filters used in the illustrated embodiment of the present invention.

FIG. 2b is a diagrammatic representation of the anterior circular arc filter pairs used in the illustrated embodiment of the present invention, Shown is an inner pair of arcs 22a, 22b and an outer pair of arcs 24a, 24b of pixel locations. The inner arcs 22a, 22b form the endocardial circular arc filter, while the outer arcs 24a, 24b form the epicardial circular arc filter. The number of pixel units between each of these pairs of arcs is chosen to be four in the preferred embodiment.

For the anterior endocardial border 10, the process basically comprises computing for each pixel $x_i,y_j$ the maximum of a set of numbers $s_2 - s_1, s_3 - s_2, \ldots s_8 - s_7$, where each $s_k$ represents the sum of pixel values on 17 radii uniformly distributed along a set of 90° arcs of radius 20, 24, 28, 32, 36, 40, 44, and 48 pixel lengths, respectively, in the illustrated embodiment. The angles associated with the pixel locations along the 90° arc range from 45° to 135°.

For the anterior epicardial border 11, the process is slightly altered to create an asymmetric filter. The physical reason for the asymmetry on the right hand side of the epicardial portion of the filter is the fact that two-dimensional transthoracic echocardiographic images frequently exhibit a shift from low intensity of returned signal between the head and transducer to high intensity in the portion representing lung. Therefore, the circular arc filter for the anterior epicardial border 11 is weighted by radial angle. For each pixel $x_i,y_j$, the maximum is determined for a set of numbers max $(s_k - s_{k+1}, 2 \cdot s_k - s_{k-1} - s_{k+1}) + t_k - t_{k+1}$, where each $s_k$ is the sum of pixel values uniformly distributed on five radii from 45° to 67°, and $t_k$ is the sum of pixel values uniformly distributed on twelve radii from 67° to 135°. In the illustrated embodiment, the circular-section arcs have a radius in the range of 20, 24, 28, 32, 36, 40, 44, and 48 pixel lengths.

To avoid double counting of pixel intensities in the anterior region, in the illustrated embodiment the radii associated with the epicardial filter is constrained to be at least seven pixel lengths larger than the radii associated with the endocardial filter.

The resulting pixel location that gives a maximum for the paired circular arc filters is designated $x_1,y_1$, which is a second tentative center-point for the left ventricle. The two radii associated with the paired filters provide estimates to the endocardial and epicardial borders 10, 11 along the anterior wall. The difference between the two radii provides an estimate of the ventricular wall thickness.

Testing of the inventive method on a variety of echocardiographic images indicates that the calculated tentative center-points $x_0,y_0$ and $x_1,y_1$ tend to be somewhat high. Experimentation has shown that the true center-point is closer to one-half of the distance between the anterior and posterior epicardial borders 11, 13 along the vertical axis defined by $x_0$. The center-point is thus determined to be located at $x_0,y_2$, where $y_2 = (y_0 + r_0 + y_1 - r_1)/2$ and the values $r_0$ and $r_1$ are the distances from the respective tentative centers to the corresponding epicardial border.

In an alternative embodiment, the method for detecting the anterior epicardial and endocardial borders is varied to include a weighting function that provides a measure of the probability that a point y is in fact a border point. The technique determines the probable locations of specular targets in the region of the anterior wall. The purpose of the procedure is to reduce the possibility fiats non-structure location in the image will be identified as epicardium.

The alternative procedure selects a narrow band (preferably 21 pixels) about the $y_0$ value determined in the steps above. A one-dimensional distribution $D(y)$ is formed by summing the pixel values at locations in the band along circular arcs centered at the location $x_0,y_0$. A value of 1 is then assigned to the epicardial weight function $epiW(y)$ at the location y if its distribution value exceeds $\frac{2}{3}$ of the maximum for the entire distribution; otherwise the value of 0 is assigned. Since the endocardium may not be quite as prominent as the epicardium in the anterior region, a value of 1 was assigned to the endocardial weight function $endoW(y)$ at the location y if its distribution value exceeds $\frac{1}{2}$ of the maximum for the entire distribution; otherwise the value of 0 is assigned.

Since the search is for boundary points, a test was devised to determine whether or not a particular location is in the cavity. The first aspect of the test is to create a second one-dimensional distribution $E(y)$ defined by the average $(D(y-10)+D(y-9)+ \ldots +D(y+9)+D(y+10))/21$. The maximum and minimum values of the $E(y)$ distribution are denoted $Emax$ and $Emin$, respectively. If $endoW(y)=1$ and $E(y-10)<(2 \times Emin+Emax)/3$, then $endoW(y)$ is increased in value from 1 to 2. This value indicates that the pixel values immediately inside the y location should be within the cavity. A similar test is used to increase $epiW(y)$ from 1 to 2. Thus defined, $endoW(y)$ and $epiW(y)$ provide a measure of the probability that location y is a border point.

While it may seem that choosing a band to be 21 pixels wide is arbitrary, this choice was made because the band needs to be wide enough to detect the endocardial and epicardial borders even if the approximation of the best-fit column $y_0$ from determined as described above is somewhat to the left or right of the true center. The band must also be chosen narrow relative to the diameter of the myocardium. The ration chosen in this embodiment is between 20% and 25% of the expected diameter.

Once the weighting functions $endoW(y)$ and $epiW(y)$ are determined, a filter operator is applied to simultaneously identify both the endocardial and epicardial borders along the anterior wall. In this embodiment of the invention, if $Q(x,y)$ is the location of a pixel near the column containing $x_0,y_0$, then the value of the filter at x,y is defined by:

$$V(x,y,k,k+c) = (s_k - s_{k+c}) \times epiW(y_1) \times (k-(k+c)) \times (s_{k+c} - s_k) \times endoW(y_2)$$

where $s_k$ is defined as above, $y_1 < y_2$, $y_1 = y-k$, $y_2 = y-(k+c)$, and c is a constant set to be 1 unit of increment in the preferred embodiment. The factor $s_k - s_{k+c}$ is a measure of the negative of the first derivative. The thickness factor $k-(k+c)$ (i.e., the constant c) forces the estimates of the epicardium and endocardium borders apart. To avoid absurd estimates of wall thickness, this factor is restricted to only those values between the minimum and maximum expected wall thickness in the anterior region. In the preferred embodiment, this value is selected to be 4 pixels.

The resulting pixel location that gives a maximum for the paired circular arc filters is designated $x_1,y_1$, which is a second tentative center-point for the left ventricle. As noted above, the center-point is determined to be located at $x_0,y_2$, where $y_2 = (y_0+r_0+y_1-r_1)/2$ and the values $r_0$ and $r_1$ are the distances from the respective tentative centers to the corresponding epicardial border.

Once the center-point is determined, the approximate location of the lateral epicardial and endocardial borders can be determined using a pair of coupled circular arc filters. Because an approximate distance to the posterior epicardial border 13 is already known, and the filters need only be calculated for a single pixel (i.e., the center-point), the computational requirements are very low. In the illustrated embodiment, for both the lateral endocardial and epicardial borders, the process basically comprises computing for each pixel $x_i,y_j$ the maximum of a set of numbers $s_2-s_1, s_3-s_5, \ldots$ where each $s_k$ represents the sum of pixel values on 17 radii uniformly distributed along a set of 90° arcs having a radius equal to the posterior epicardial distance $\pm 3$ pixel lengths. The angles associated with the pixel locations along the 90° arc range from 315° to 45° for the right lateral wall, and from 135° to 225° for the left lateral wall.

Thus, the first step of the inventive method automatically determines the center-point of the left ventricle and reasonable approximations of the location of the epicardial border and the anterior and antero-lateral endocardial border.

Determining Best-Fit of Elliptical Arc Model

While the epicardial and endocardial borders are oval in appearance, attempts to model these edges with a true ellipse will be frustrated by the fact that the motion and surface of the head exhibit numerous irregularities. To avoid the instabilities encountered with such an approach, in the present invention, the epicardial and endocardial borders are modeled by curves formed as a union of six elliptical arcs spliced together. Four of the arcs are used to model the entire epicardial border, while the other two arcs model the anterior endocardial border 10. The gap between the best-fit pair of inner and outer arcs provides a measure of wall thickness along the anterior wall. The use of paired inner and outer arcs helps prevent the identification of the endocardial border as the epicardial border, or vice versa.

Using the $x_0,y_2$ center-point determined by the method described above, the echocardiographic image is divided into 32 equiangular sectors (i.e., 11.25° per sector) in the illustrated embodiment. For each sector, a one-dimensional histogram is generated that represents the cumulative gray level (or intensity) distribution of pixels from the center-point to a selected radial distance, versus the sum of the gray levels of the pixels at a given distance across a narrow arcuate region centered on the center-point.

For example, if the radius is started at 20 pixel lengths, and increased by four pixels for each histogram computation, then all of the pixel intensities laying on each 11.25° arc at 20 pixel lengths are summed and scaled to the cumulative intensity level of all of the pixel values in the wedge-shaped region from the center-point to 20 pixel lengths, then all of the pixel intensities laying on each arc at 24 pixel lengths are summed and scaled to the cumulative intensity level of all of the pixel values in the wedge-shaped region from the center-point to 24 pixel lengths, etc.

This preferred method thus weights outer arcs more than inner arcs, since outer arcs contain more pixels along the arc length. Such weighting has some advantages in helping to distinguish the epicardial border from the endocardial border. However, if desired, the pixel counts may be normalized to give equal weighting regardless of radius, or only the pixels laying on a single ray (e.g., the radius defining one of the two borders of a sector) may be summed in the histogram.

To further distinguish histogram counts that represent significant intensity differences, the first derivative is computed for each of the histograms. In the illustrated embodiment, a new array of histogram of values $H_i$ is computed by the equation $H_i' = H_i - H_{i-1}$. The effect of computing the first derivative histogram is to emphasize the magnitude of any differences between pixel values. (In practice, in order to accommodate signal dropout in the echocardiographic image, a group of pixels may be treated as a "superpixel" for purposes of forming the original histogram before computing the first derivative histogram).

After computing the first derivative histogram for each sector, the values of each histogram are scanned to determine the two peak values (with the constraint that the peaks be at least seven pixel lengths apart). In the histograms representing angles of 45° through 155° (the approximate location of the interventricular septum), the locations of the highest two peaks of the negative of the first derivative are also determined and saved.

Figure 3:
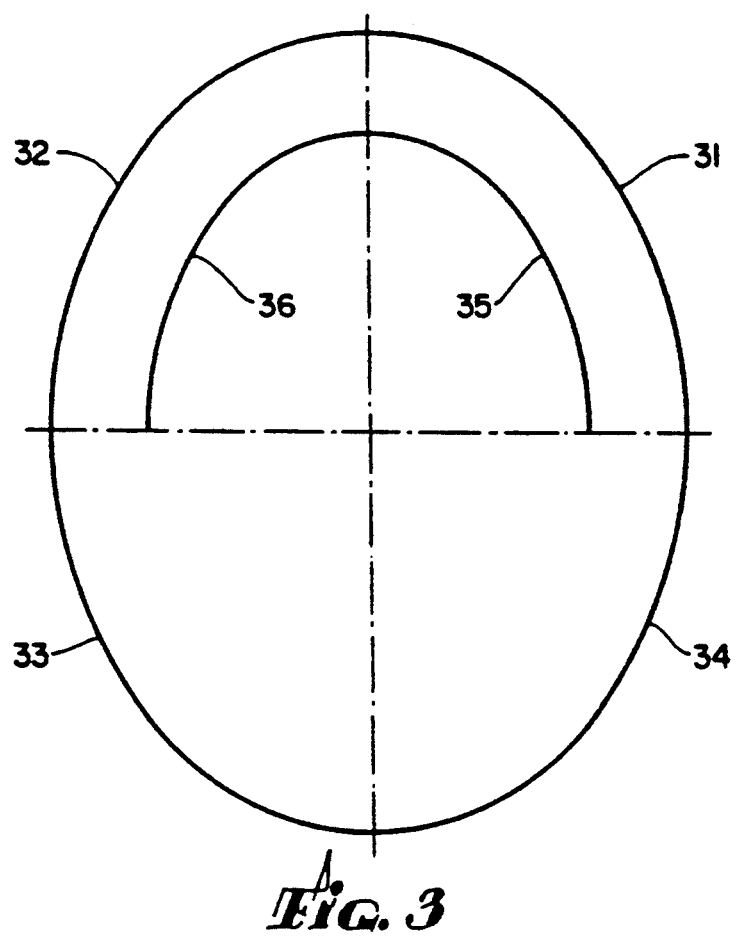
FIG. 3 is a diagrammatic representation of the six elliptical arcs used to model the epicardial and endocardial borders of an echocardiographic image in accordance with the present invention.

The next step of the process is to choose a set of spliced elliptical arcs which best-fit the epicardial border and anterior endocardial border. Since a single ellipse will not fit either border closely, the inventive process selects a set of six best-fit elliptical arcs (each comprising a quadrant of an ellipse) having the ends "spliced" together, as shown in FIG. 3. The six elliptical arcs are labeled 31 through 36.

The equation for a vertically-oriented ellipse centered at the origin is $x^2/b^2 + y^2/a^2 = 1$, where a is the length of the semi-major axis and b is the length of the semi-minor axis of the ellipse. A quadrant of an ellipse is therefore determined by the same parameters a and b. Thus, with respect to the echocardiographic image under analysis, tentative elliptical arcs comprising a quadrant of an ellipse are compared for a best-fit to the first derivative histograms for a corresponding quadrant of the epicardial or endocardial border.

Simplifying constraints reduce the computational requirements in the preferred embodiment. The origin for each elliptical arc is the center-point. It has been found that the distance computed from the center-point to the posterior epicardial border 13 determined by the circular arc filter process is quite reliable. Therefore, in the preferred embodiment of the invention, that distance is considered to be a constant as the value for the semi-major axis of elliptical arcs 33 and 34 in FIG. 3. The distance from the center-point to the anterior epicardial border 11 has been found to be not as reliable an estimate as desired, so a small range of values (e.g., three to five) around the nominal computed value are used as the possible lengths for the semi-major axis of elliptical arcs 31 and 32. The computed distances from the center-point to each of the lateral epicardial borders are used as the lengths for the semi-minor axis for elliptical arcs 32 and 33, and 31 and 34, respectively. (If need be, a range of values around the nominal lateral border distances may be used). Similarly, initial values for the semi-major and semi-minor axes of the elliptical arcs 35, 36 are chosen from the computed values for the anterior endocardial border 10 and the lateral endocardial border.

A further constraint requires that the lengths of the semi-major and semi-minor axes for the anterior epicardial and endocardial elliptical arcs differ by at least seven pixel lengths (i.e., the minimum wall thickness is seven pixels). Another constraint is that parameter a can be no more than double the size of parameter b. Thus, the shape of the epicardium is assumed to be relatively round rather than oblong. Lastly, the inner elliptical arcs 35, 36 are paired with the outer elliptical arcs 31–34 for purposes of determining a best-fit to the histogram data.

These constraints establish a set of possible arc pairs resulting from the combinations of elliptical quadrants that meet these constraints.

Within these constraints, the coordinates of the possible elliptical arc pairs (i.e., the inner arcs 35, 36 and outer arcs 31–34) are compared against the peak values of the first derivative histograms, and a "figure of merit" N is computed for each pair of arcs. In the illustrated embodiment, N is computed in accordance with four rules: (1) N is initially set to zero for each pair of arcs being evaluated; (2) if a first derivative histogram representing an angle between 0° and 180° has a peak within three pixel lengths of the arcs 35, 36 representing the endocardial border, N is increased by one; (3) if a first derivative histogram representing an angle between 155° and 427° (i.e., from 155° counter-clockwise around to 67°) has a peak within three pixel lengths of the arcs 32, 33, 34, 31 representing the epicardial border, N is increased by one; (4) if the negative of a first derivative histogram representing an angle between 45° and 155° has a peak within three pixel lengths of the arcs 31, 32 representing the anterior epicardial border, N is increased by one.

The parameters a and b are varied as described above to define a range of arc pairs. The pair of inner arcs 35, 36 and outer arcs 31–34 with the largest value of N is considered to be the best fit to the histogram data, and thus define an elliptical arc model for the epicardial border and anterior endocardial border.

Of the three end-systolic echocardiographic frames analyzed, the one giving the highest value for N is chosen as the optimal end-systolic frame.

The steps set forth above with respect to automatic determination of a center-point, and modeling the epicardial and endocardial borders with joined elliptical arcs, are repeated for sets of three echocardiographic image frames selected from mid-systole and end-diastole.

Figure 4A:
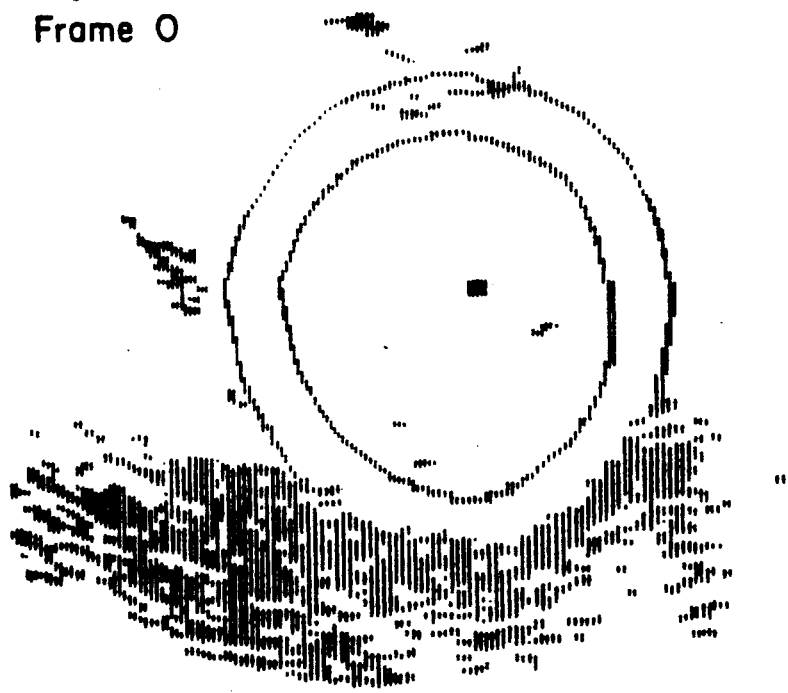
FIG. 4a is a photograph of an echocardiographic image showing the center-point, endocardial border, and epicardial border at end-systole, as defined by the automated method of the present invention.
Figure 4B:
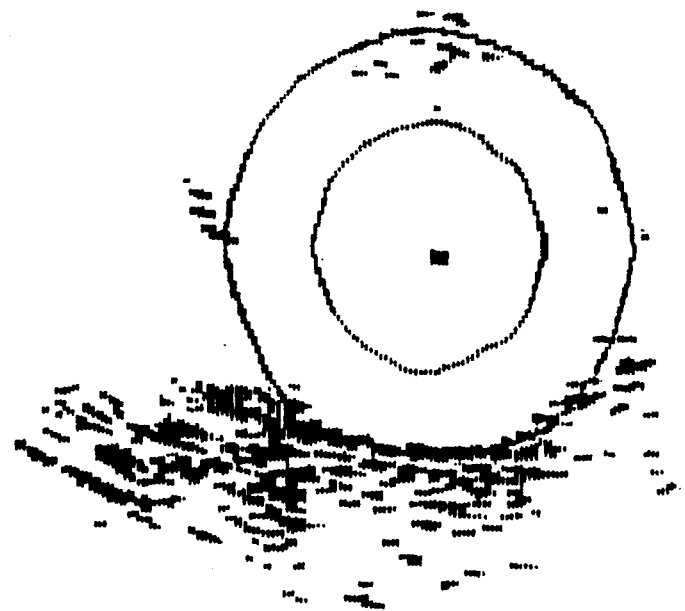
FIG. 4b is a photograph of an echocardiographic image showing the center-point, endocardial border, and epicardial border at end-diastole, as defined by the automated method of the present invention.

The ventricular center and the elliptical models thus determined for end-systole, mid-systole, and end-diastole may then be superimposed over the corresponding echocardiographic images on a display screen. FIG. 4a is a photograph of an echocardiographic image showing the center-point 40, endocardial border 41, and epicardial border 42 at end-diastole defined by the automated method of the present invention. FIG. 4b is a photograph of an echocardiographic image showing the center-point 40, endocardial border 41, and epicardial border 42 at end-systole defined by the automated method of the present invention.

Since the above process generates a model of the endocardium, by using well-known mathematical formulae, the volume encompassed by the elliptical model can be computed.

Detection of Flattened Interventricular Septum

The invention also includes a means for determining the presence of a flattened interventricular septum caused by pressure or volume overload from the right ventricle.

In general, a paired set of straight line filters perpendicular to a radius from the center-point through the septum are applied to the echocardiographic image data in a manner similar to the paired circular arc filters used to detect the anterior epicardial and endocardial borders. The use of paired inner and outer straight line filters helps prevent the identification of the right ventricular side of the septum as the left ventricular side, or vice versa. In a similar manner, a pair of circular arc filters centered on the center-point and directed at an angle of 90° through 180° towards the septum are applied to the echocardiographic image data. A comparison of the best-fit circular arc filters and the best-fit straight line filters to the image data gives an indication of whether the septum is flattened.

In particular, if the septum is flattened, then the pair of straight line filters will provide a better "fit" to the data than will the pair of circular arc filters. Which of the two pairs of filters is a better fit is determined by finding the larger of two integers $N_c$ (a figure of merit for the circular arc filters) and $N_s$ (a figure of merit for the straight line filters). $N_c$ is computed in exactly the same way as the integer N computed in determining the best-fit elliptical arc model described above, with the exception that computation is limited to angles in the quadrant between 90° and 180°.

$N_s$ is computed based upon a one-dimensional histogram generated in a band oriented along a radius from the center-point through the septum. The histogram represents the cumulative gray level (or intensity) distribution of pixels from the center-point to a selected radial distance along the band, versus the sum of the gray levels of the pixels across a narrow region at a given distance along the band. $N_s$ is computed to be the sum of $N_1$ and $N_2$. $N_1$ is the number of peaks of the negative of the first derivative of the histogram data within three pixel units of the straight line drawn between a point $P_1$ representing the epicardial border at 180° and a point $Q_1$ representing the epicardial border at 90° (these points being known from determining the epicardial border as described above). $N_2$ is the number of peaks of the first derivative of the histogram data within three pixel units of the straight line drawn between a point $P_2$ representing the endocardial border at 180° and a point $Q_2$ representing the endocardial border at 90° (these points being known from determining the endocardial border as described above). If $N_s > N_c$, the septum is considered to be "flattened".

Determination of Wall Motion

An additional feature of the inventive method is to extract motion information from a set of time varying echocardiographic images. The basic motion of the endocardial surface is radially oriented with respect to a parasternal short-axis two-dimensional echocardiographic image. In other words, motion of the endocardial surface is parallel to the radii emanating from the center of the left ventricle, and the orientation of the endocardium is perpendicular to the radii during any point in time.

Using the center-point determined in accordance with the procedure set forth above, eight one-dimensional histograms are formed for each of eight 45° sectors emanating from the center-point. The cross-correlation technique is used on each of these histograms between the frame at end-diastole and the frame at end-systole to detect the wall motion in each of the different regions. A novel feature of this approach is that cross-correlation of the histograms provides a dynamic matched filter requiring only an imperfect estimate of the endocardial border.

The histograms are formed in a manner basically the same as set forth above with respect to the thirty-two radial histograms used for determining the epicardial and endocardial borders. In the same manner, the radial first derivative of each of the histograms is generated, and the cross-correlation technique is applied to the first derivative histograms. By using the first derivative, if a significant peak is generated, the location of this peak will appear as the location of maximum cross-correlation. Using the same method as described above for modeling the epicardial and endocardial borders, an estimate of the location of the epicardial and endocardial borders is derived by determining the two peak values of each histogram.

Because the epicardial border moves at a rate of only about one-half that of the endocardial border, the histogram values are truncated to zero beyond the point midway between the estimate of the endocardial and epicardial borders. By eliminating the damping effect of the motion of the epicardium, this technique helps to provide more accurate quantitation of the wall motion. Thus, the inventive method provides quantitation of regional wall motion without performing actual border detection. This process maximizes the use of the image information used in quantitation.

The histogram values from one time period (e.g., end-diastole) are then shifted in a step-wise manner by different radial distances and compared with the corresponding histogram from a second time period (e.g., end-systole). The amount of radial shift producing the maximum cross-correlation (i.e., statistical correspondence of like-positioned histogram values from the first time period compared to the second time period) gives an estimate of the amount of wall motion in each sector between the two time frames studied. More specifically, the cross-correlation for each shift position of the histograms can be computed as the sum of the products between corresponding histogram values from the first time period and the second time period. The average velocity of the shift can be calculated by dividing the radial shift value by the time difference between the two time frames studied.

Figure 5:
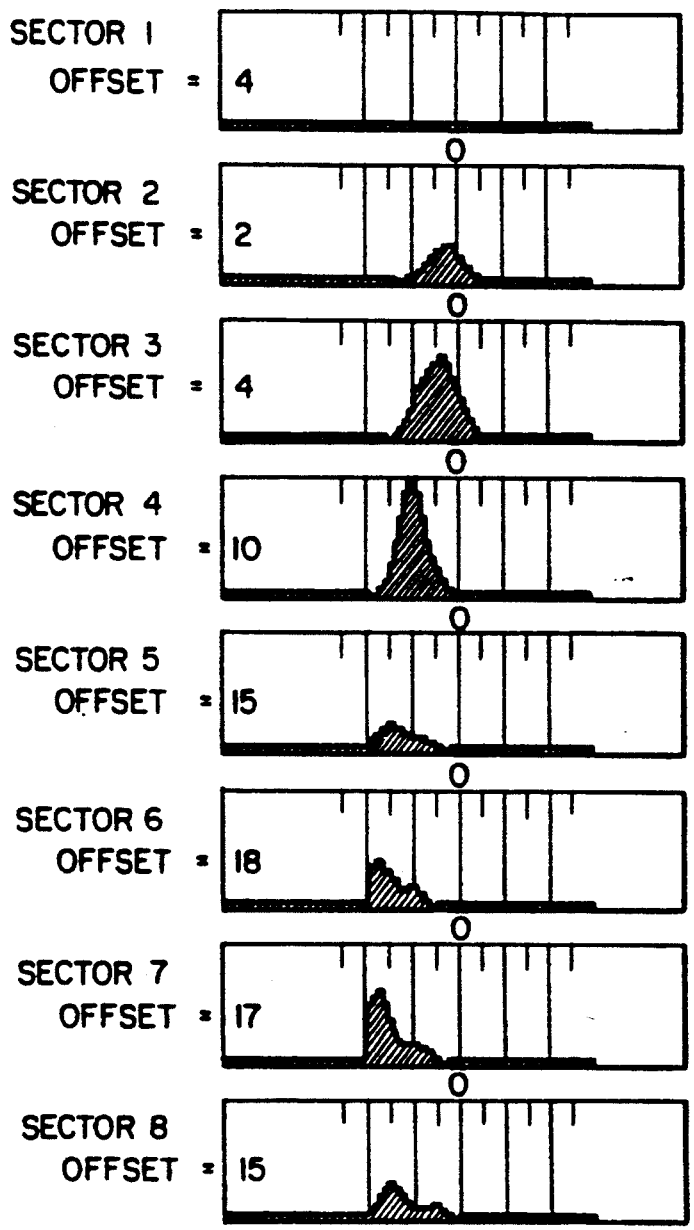
FIG. 5 shows an example set of eight sector cross-correlation power curves generated by the present invention for determining cardiac wall motion. The variable offset value in each sector indicates the computed estimate of the number of radial units the endocardium has moved in that sector.

The sums of products for each shift calculation can be displayed as a power curve. FIG. 5 shows an example set of eight sector cross-correlation power curves generated by the present invention for determining cardiac wall motion. The variable offset value in each sector indicates the computed estimate of the number of radial units the endocardium has moved in that sector. The offset value is computed as the pixel shift amount where the power curve is maximized. This peak value is the position of best correlation of the histogram comparison.

Detection of Signal Loss Across the Interventricular Septum

The invention also includes a test to detect the lack of signal ("dropout") across the interventricular septum between the left and right ventricles. The structure and contractile state of the septum is an important factor in determining the condition of the heart. Dropout across the septum indicates that the echocardiographic image may lack sufficient informational content to properly determine such structural and operational characteristics.

The septum signal dropout test consists of a comparison of (1) the minimum average grey level of a small image region in the cavity of the heart around the determined center-point (which determines a background signal level), with (2) the maximum average grey level of a set of similarly sized regions chosen along a line from the center-point of the ventricle in the direction of the septum (which determines a peak signal level). If the maximum ratio of the peak level to the background level for the series of comparisons is less than two, signal dropout is considered to have been detected.

Figure 6:
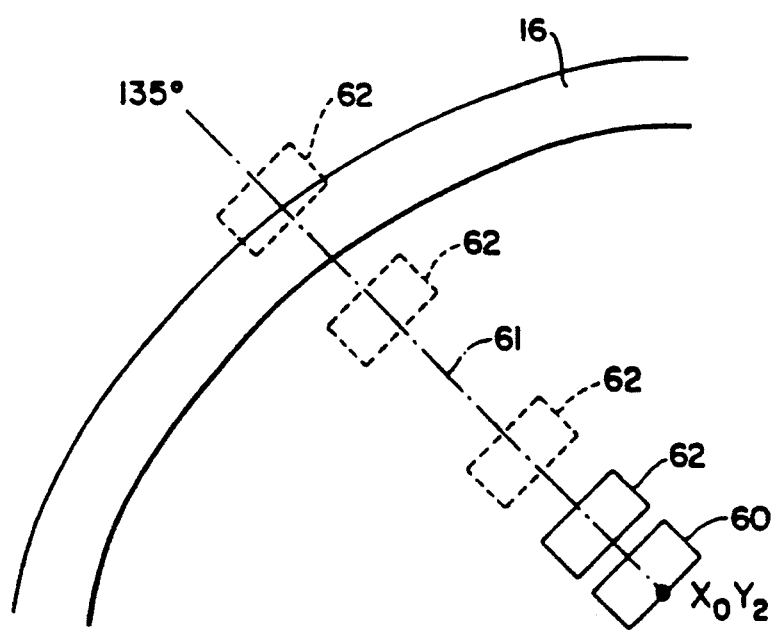
FIG. 6 is a diagrammatic representation of the comparison regions, and their orientation with respect to the heart, used in the illustrated embodiment of the present invention for determining signal loss across the interventricular septum.

FIG. 6 is a diagrammatic representation of the comparison regions, and their orientation with respect to the heart, used in the illustrated embodiment of the present invention for determining dropout across the septum. The first region 60 is defined to be a rectangle that is 21 pixels wide, centered on a line 61 running from the center-point at an angle of about 135° through the septum 16, and 10 pixels high. The second region 62 is similarly sized. The peak-to-background ratio is computed for a first placement of the second region 62, and then the second region 62 is "slid" out along the line 61 by a predetermined amount (e.g., one pixel length) and the ratio is recomputed. A series of such computations is performed until the second region 62 has been moved out along the line 61 to a point that would necessarily have included the septum (e.g., about 60 or 70 pixel lengths from the center-point). If the maximum value of the set of ratios is less than two, indicating that little difference exists between the background signal level and the "peak" signal level in the direction of the septum, signal dropout across the septum is considered to have been detected.

Blood Pool Classification

The invention further includes a method of performing blood pool classification on a pixel-by-pixel basis, starting from an automated determination of the center of the ventricle.

Blood pool classification attempts to determine whether a particular pixel in an image represents blood or tissue. Using the present invention, the center $x_0,y_2$ of the left ventricle can be determined, as well as an elliptical arc model of the entire epicardial border, using the techniques described above. In the preferred embodiment, the model parameters can then be adjusted by a percentage (e.g., 80%) of the estimated wall thickness of the organ (determined from the elliptical arc model of the anterior endocardial border) to define a new elliptical arc model that represents a limited region of search for the blood pool. (While the area of the elliptical model, accounting for wall thickness, can be used as a crude estimate of the size if the blood pool, the model does not take into account internal structures within the ventricle that reduce the size of the blood pool). In the alternative, only the center-point $x_0,y_2$ is used to apply a blood pool classification procedure.

Using the center-point $x_0,y_2$, the left ventricle is divided into a plurality (e.g., 32) of equiangular regions where subsets of the blood pool pixels can be determined in order to estimate regional function. For each equiangular region, the intensity value of each pixel is compared to an average value for all pixels in the region. If a pixel value is greater than a percentage (e.g., 65%) of the average value for a region, the pixel is considered to be structure; otherwise, the pixel is considered to be blood. The average value can be determined simply by summing all of the pixel values in a region and dividing by the number of pixels in the region. If the adjusted elliptical arc model is used, the boundary defined by the model limits the pixels to be evaluated.

In an alternative embodiment, a normalized radial distribution is computed by summing the pixel values in arcuate areas in an equiangular region along a radius centered at the location $x_0,y_0$, and then dividing the sum by the area of each arcuate area to give equal weighting to each area regardless of radius. The normalized sum for each arcuate area may then be compared to a threshold value (e.g., a percentage of the average value for all pixels in the region) to determine whether the area comprises structure or blood. This approach averages the pixels in an area to minimize isolated high pixel values caused by noise.

Other methods of evaluating the pixels bounded by the adjusted elliptical arc model can be applied. For example, the image processing technique of dilation and erosion can be applied to the pixels within a region, using a circular or mildly elliptical structuring dement to process each pixel, in known fashion. The eroded/dilated pixels may then be compared to a threshold value for determination of inclusion or exclusion in the blood pool.

Other techniques known in the art for classifying blood pool pixels can be used in similar fashion in conjunction with the computed center-point and/or computed region of search generated by the present invention. For example, the center-point $x_0,y_2$ can be computed, then a region of search, expressed in rectangular coordinates. Thereafter, the region of search can be translated into the polar coordinate frame of reference of the original transducer scan data, in known fashion, and used to limit the analysis of direct polar scan line data from a diagnostic imaging device (e.g., ultrasound). One such device is described in *Rational-Gain-Compensation for Attenuation in Ultrasonic Cardiac Imaging*, Melton, Jr., H. E. and Skorton, D. J., 1981 Ultrasonics Symposium, pp. 607-611 (IEEE).

Once the pixels within an image are classified as being in the blood pool, a number of computations can be performed. For example, the number of pixels in the blood pool at end diastole ($BP_{ED}$) and the number of pixels in the blood pool at end systole ($BP_{ES}$) can be used to compute the Area Change Fraction for the left ventricle:

$$ACF_{LV} = 100\% \times (BP_{ED} - BP_{ES})/BP_{ED}$$

In a similar manner, the regional area change fraction can be computed for any of the angular regions to look for regional function defects suggestive of ischemic disease.

The area of the left ventricle can be determined by the area bounded by the adjusted elliptical arc model, or by the largest blood pool computation sum. The long axis of the heart can be assumed to be a percentage (e.g., about 150% to about 160%) of the short axis length. The volume of the left ventricle can then be calculated using such models as the hemisphere-cylinder model:

$$V_{LV} = 5/6 \times \text{Area}_{LV} \times \text{Long Axis Length}$$

SUMMARY COMMENTS

The invention has great practical potential in both the clinical and operating room setting. An anesthesiologist caring for an increasingly older patient lead and with increasingly more cardiovascular disease would benefit from an automated, non-invasive echocardiographic system which would monitor their patients for early signs of ischemia. Such a device would alert the physician of the need for alterations in anesthetic depth and technique. Recent literature indicates that with current technology, anesthesiologists cannot easily detect the early signs of ischemia.

With the availability of a system which provides a more rapid and more accurate analysis of two-dimensional short-axis cardiac images, cardiologists would have an increased ability to study patients over a longer period of time and in more diverse situations. As preoperative ischemia and post-operative ischemia becomes more recognized as a significant indicator of risk, such a system would allow automated monitoring of patients both before and after surgery.

A number of embodiments of the present invention have been described. Nevertheless, it will be understood that various modifications may be made without departing from the spirit and scope of the invention. For example, while the invention has been described principally in terms of rectangular coordinates, all of the methods described may be applied to echocardiographic image data in polar coordinates.

As another example, the center-point and endocardial and epicardial wall search regions determined using the circular arc filters as described above might be used as region-of-search indicators for other already developed edge-detection algorithms, such as the one described by L. Zhang and E. A. Geiser, *An Effective Algorithm for Extracting Serial Endocardial Borders From 2-D Echocardiograms*, IEEE, Transactions Biomed. Eng., Vol. BME-31, pp. 441–447, 1984. Thus, edge-detection algorithms that previously required extensive operator input could now be made more convenient to use because of the automated center-point and region-of-interest determination method described above.

As yet another example, because the invention provides a means for detecting elliptical objects in a fully automated fashion from ultrasound images, another application would be in the aging of fetal development. This is currently done by manual measurement of diameters, circumference, and area of the fetal head by obstetrical ultrasound studies. The present invention could accomplish these measurements in a fully automated fashion in real-time or near real-time.

As still another example, the methods of the present invention provides a means for detecting elliptical objects in a fully automated fashion from digital images generated by means other than ultrasound, such as photographic, X-rays (planar and tomographic), and magnetic resonance imaging.

Accordingly, it is to be understood that the invention is not to be limited by the specific illustrated embodiment, but only by the scope of the appended claims.

We claim:

1. A method for quantitatively analyzing diagnostic images of approximately curvilinear bounded organs, including the steps of:
    a. generating a diagnostic image of an approximately curvilinear bounded organ;
    b. determining a center-point for the approximately curvilinear bounded organ depicted in the diagnostic image by repeatedly filtering the diagnostic image with a set of circular arc filters until a maximum value for the set of filters is obtained;
    c. indicating the position of the center-point in connection with the diagnostic image.

2. The method of claim 1, wherein the step of filtering the diagnostic image includes the step of:
    computing for a selected set of pixels $x_i, y_j$ of the diagnostic image the maximum of a set of numbers $s_k - s_{k-1}$, where $s_k$ represents the sum of pixel values on a selected set of radii uniformly distributed along a semicircular arc of radius k.

3. The method of claim 1, further including the steps of:
    a. determining a best-fit elliptical arc model of a border of the approximately curvilinear bounded organ, the elliptical model being centered at the center-point;
    b. indicating the position of the elliptical arc model in connection with the diagnostic image.

4. The method of claim 3, wherein the step of determining a best-fit elliptical arc model includes the step of:
    a. generating a one-dimensional histogram of radial pixel values for each of a set of sectors centered on the center-point.

5. The method of claim 4, wherein the step of determining a best-fit elliptical arc model includes the steps of:
    a. generating a first derivative histogram for each sector from each corresponding one-dimensional histogram of radial pixel values;
    b. determining at least one peak value of the first derivative histogram for each sector, representing a probable location of the border of the approximately curvilinear bounded organ within the sector.

6. A method for determining the motion of a border of an approximately curvilinear bounded organ, including the steps of:
    a. generating a first and second diagnostic image of an approximately curvilinear bounded organ, the diagnostic images being generated at different times;
    b. determining a center-point of the approximately curvilinear bounded organ for each of the first and second diagnostic images by repeatedly filtering each of the diagnostic images with a set of circular arc filters until a maximum value for the corresponding set of filters is obtained;
    c. generating a first and second one-dimensional histogram of radial pixel values for each of a set of sectors centered on the center-point of each of the corresponding first and second diagnostic images;
    d. generating a first and second first derivative histogram for each sector from each corresponding first and second one-dimensional histograms of radial pixel values;

e. determining the maximum cross-correlation of the first and second first derivative histograms for each sector;

f. indicating the maximum cross-correlation in each sector as a measure of the change in position in each sector of the border of the approximately curvilinear bounded organ between the first and second diagnostic images.

7. The method of claim 6, including the further steps of:

a. determining the average velocity of the change of position of the border for each sector, by dividing the measure of change of position for each sector by the time difference between the generation of the first and second diagnostic images;

b. indicating the average velocity so determined for each sector.

8. A method for determining the lack of a sufficient image signal across the interventricular septum of an echocardiogram, comprising the steps of:

a. generating a digital ultrasonic image of a heart;

b. determining a center-point for the left ventricle of the heart depicted in the diagnostic image by repeatedly filtering the diagnostic image with a set of circular arc filters until a maximum value for the set of filters is obtained;

c. determining the minimum average grey level of an image region in the left ventricle of the heart positioned around the center-point, thereby determining a background signal level;

d. determining the maximum average grey level for a set of image regions positioned along a line from the center-point of the left ventricle to at least the interventricular septum, thereby determining a peak signal level;

e. comparing the background signal level to the peak signal level;

f. if the maximum ratio of the peak signal level to the background signal level is less than about two, then indicating that the image signal across the interventricular septum of the echocardiogram is insufficient.

9. A method for determining the occurrence of a flattened interventricular septum from a diagnostic image of a heart, comprising the steps of:

a. generating a diagnostic image of a heart;

b. determining a center-point for the left ventricle of the heart depicted in the diagnostic image by repeatedly filtering the diagnostic image with a set of circular arc filters until a maximum value for the set of filters is obtained;

c. generating a best-fit to the endocardial and epicardial borders of the interventricular septum of a pair of straight line filters oriented perpendicular to a line from the center-point to at least the interventricular septum;

d. generating a best-fit to the endocardial and epicardial borders of the interventricular septum of a pair of circular arc filters centered on the center-point and encompassing at least the interventricular septum;

e. determining a figure of merit $N_c$ for the pair of circular arc filters and a figure of merit $N_s$ for the pair of straight line filters;

f. if $N_s$ is greater than $N_c$, then indicating that the interventricular septum is flattened.

10. A method for quantitatively analyzing diagnostic images of the heart, including the steps of:

a. generating a diagnostic image of the heart;

b. determining a first tentative center-point for and a region of search for the posterior epicardial border of the heart depicted in the diagnostic image by repeatedly filtering the diagnostic image with a set of circular arc filters until a maximum value for the set of filters is obtained;

c. determining a second tentative center-point for and a region of search for the anterior endocardial and epicardial borders of the heart depicted in the diagnostic image by repeatedly filtering the diagnostic image with a set of coupled circular arc filters until a maximum value for the set of coupled filters is obtained;

d. determining a final center-point for the heart depicted in the diagnostic image as midway between the anterior epicardial border and the posterior epicardial border along a line through the first and second tentative center-points;

e. indicating the position of the final center-point in connection with the diagnostic image.

11. The method of claim 10, wherein the step of filtering the diagnostic image in determining the first tentative center-point includes the step of:

a. computing for a selected set of pixels $x_i, y_j$ of the diagnostic image the maximum of a set of numbers $s_k - s_{k-1}$, where $s_k$ represents the sum of pixel values on a selected set of radii uniformly distributed along a semicircular arc of radius k.

12. The method of claim 10, wherein the step of filtering the diagnostic image in determining the second tentative center-point and the region of search for the anterior endocardial border includes the step of:

a. computing, for a selected set of pixels $x_i, y_j$ of the diagnostic image within a selected distance from the first tentative center-point, the maximum of a set of numbers $s_k - s_{k-1}$, where $s_k$ represents the sum of pixel values on a selected set of radii uniformly distributed along an arc of radius k.

13. The method of claim 10, wherein the step of filtering the diagnostic image in determining the second tentative center-point and the region of search for the anterior epicardial border includes the step of:

a. computing, for a selected set of pixels $x_i, y_j$ of the diagnostic image within a selected distance from the first tentative center-point, the maximum of a set of numbers max $(s_k - s_{k+1}, 2 \cdot s_k - s_{k-1} - s_{k+1}) + t_k - t_{k+1}$, where each $s_k$ is the sum of pixel values on a first set of radii uniformly distributed along an arc of radius k, and each $t_k$ is the sum of pixel values on a second set of radii uniformly distributed along the arc of radius k.

14. The method of claim 13, further including the steps of:

a. determining a best-fit elliptical arc model of the epicardial and anterior endocardial borders of the heart, the elliptical model being centered at the final center-point;

b. indicating the position of the elliptical arc model in connection with the diagnostic image of the heart.

15. The method of claim 14, wherein the step of determining a best-fit elliptical arc model includes the step of:

a. generating a one-dimensional histogram of radial pixel values for each of a set of sectors centered on the final center-point.

16. The method of claim 15, wherein the step of determining a best-fit elliptical arc model includes the steps of:
   a. generating a first derivative histogram for each sector from each corresponding one-dimensional histogram of radial pixel values;
   b. determining at least two peak values of the first derivative histogram for each sector, representing the probable locations of the epicardial and endocardial borders of the heart within the sector.

17. The method of claim 1, wherein the step of filtering the diagnostic image includes the steps of:
   a. for a selected first set of pixels $x_i, y_j$ of the diagnostic image, computing the maximum of a set of numbers $s_k - s_{k-1} + s_k - s_{k-2}$, where $s_k$ represents the sum of pixel values on a selected set of radii uniformly distributed along a semicircular arc of radius k, thereby determining a first approximation of the center-point;
   b. for a selected second set of pixels $x_k, y_j$ of the diagnostic image within a first distance from the first approximated center-point, computing the maximum of a set of numbers $s_k - s_{k-1} + s_k - s_{k-2}$, thereby determining a second approximation of the center-point;
   c. for a selected third set of pixels $x_m, y_n$ of the diagnostic image within a second distance from the second approximated center-point, the second distance being less than the first distance, computing the maximum of a set of numbers $s_k - s_{k-1}$, thereby determining a third approximation of the center-point.

18. The method of claim 10, wherein the step of filtering the diagnostic image in determining the first tentative center-point includes the step of:
   a. for a selected first set of pixels $x_i, y_j$ of the diagnostic image, computing the maximum of a set of numbers $s_k - s_{k-1} + s_k - s_{k-2}$, where $s_k$ represents the sum of pixel values on a selected set of radii uniformly distributed along a semicircular arc of radius k, thereby determining a first approximation of the tentative center-point;
   b. for a selected second set of pixels $x_k, y_j$ of the diagnostic image within a first distance from the first approximated center-point, computing the maximum of a set of numbers $s_k - s_{k-1} + s_k - s_{k-2}$, thereby determining a second approximation of the tentative center-point;
   c. for a selected third set of pixels $x_m, y_n$ of the diagnostic image within a second distance from the second approximated center-point, the second distance being less than the first distance, computing the maximum of a set of numbers $s_k - s_{k-1}$, thereby determining a third approximation of the tentative center-point.

19. The method of claim 10, wherein the step of filtering the diagnostic image in determining the second tentative center-point and the region of search for the anterior epicardial border includes the steps of:
   a. for a selected set of pixels of the diagnostic image within a selected distance from the first tentative center-point, computing a distribution D(y) as the sum of the pixel values in a set of circular arcs centered at the first tentative center-point at a distance y;
   b. for each value y in the distribution D(y), computing a first weighting function epiW(y) as a measure of the probability that pixels at location y are part of the epicardial border, and computing a second weighting function endoW(y) as a measure of the probability that pixels at location y are part of the endocardial border;
   c. for a selected set of pixels $x_k, y_j$ of the diagnostic image within a selected distance from the first tentative center-point, computing the maximum of a set of numbers:

$$V(x,y,k,k+c) = (s_k - s_{k+c}) \times epiW\text{-}(y_1) \times (k - (k+c)) \times (s_{k+c} - s_k) \times endoW(y_2)$$

where $s_k$ represents the sum of pixel values on a selected set of radii uniformly distributed along a semicircular arc of radius k, $y_1 < y_2$, $y_1 = y - k$, $y_2 = y - (k+c)$, and c is a constant.

20. The method of claim 19, wherein the first and second weighting functions are initially computed to have values of 0 or 1, and further including the steps of:
   a. computing a second distribution E(y) as the average $[D(y-n) + D(y-n-1) \ldots D(y+n-1) + D(y+n)]/n$, where n is a selected distance from the first tentative center-point;
   b. assigning a value of 2 to a weighting function at location y if the weighting function is initially assigned a value of 1, and if:

$$E(y-n) < (2 \times E_{min} + E_{max})/3$$

where $E_{min}$ is the minimum value of the second distribution E(y), and $E_{max}$ is the maximum value of the second distribution E(y).

21. A method for quantitative blood pool classification from diagnostic images of the heart, including the steps of:
   a. generating a diagnostic image of the heart;
   b. determining a first tentative center-point for and a region of search for the posterior epicardial border of the heart depicted in the diagnostic image by repeatedly filtering the diagnostic image with a set of circular arc filters until a maximum value for the set of filters is obtained;
   c. determining a second tentative center-point for and a region of search for the anterior endocardial and epicardial borders of the heart depicted in the diagnostic image by repeatedly filtering the diagnostic image with a set of coupled circular arc filters until a maximum value for the set of coupled filters is obtained;
   d. determining a final center-point for the heart depicted in the diagnostic image as midway between the anterior epicardial border and the posterior epicardial border along a line through the first and second tentative center-points;
   e. determining a best-fit elliptical arc model of the border of the heart, the elliptical arc model being centered at the center-point;
   f. classifying pixels within the elliptical arc model whose values do not exceed a threshold value as being part of the blood pool;
   g. summing the pixels classified as being part of the blood pool to determine a blood pool value, BP.

22. The method of claim 21, wherein the step of classifying pixels comprises the further steps of
   a. determining a normalized radial distribution of a plurality of sets of pixels, centered on the final center-point;

b. determining an average value for the pixels in the plurality of sets of pixels;

c. assigning each set of pixels having a normalized value less than a selected percentage of the average value as being part of the blood pool.

23. The method of claim 21, wherein the step of classifying pixels comprises the further steps of:

a. determining an average value for the pixels in at least one defined region within the elliptical arc model;

b. assigning each pixel within at least one defined region and having a value less than a selected percentage of the average value as being part of the blood pool of such at least one region.

24. The method of claim 22, wherein a plurality of regions within the elliptical arc model are defined as equiangular regions centered on the final center-point.

25. The method of claim 21, comprising the further steps of:

a. determining the blood pool value at end diastole, $BP_{ED}$;

b. determining the blood pool value at end systole, $BP_{ES}$;

c. computing the area change fraction ACF for the region defined by the elliptical arc model as:

$$ACF = 100\% \times (BP_{ED} - BP_{ES})/BP_{ED}.$$

* * * * *

UNITED STATES PATENT AND TRADEMARK OFFICE
CERTIFICATE OF CORRECTION

PATENT NO.    :   5,360,006

DATED         :   November 1, 1994

INVENTOR(S)   :   Edward A. Geiser, David C. Wilson and Gordon L. Gibby

It is certified that error appears in the above-identified patent and that said Letters Patent is hereby corrected as shown below:

In column 1, line 5, before "RELATED APPLICATION" please insert therefor --This invention was made with Government support under government contract number RO1-HL35927 awarded by the National Institutes of Health. The government has certain rights in this invention.--.

Signed and Sealed this

Fifth Day of September, 1995

Attest:

Attesting Officer

BRUCE LEHMAN

Commissioner of Patents and Trademarks